PRODUCTION OF MAGNETIC SOUND TAPE

Filed Dec. 21, 1950 2 Sheets-Sheet 1

INVENTORS
William C. Speed
James J. Dwyer
BY
Pennie, Edmonds, Morton & Barrows
ATTORNEYS

PRODUCTION OF MAGNETIC SOUND TAPE

Filed Dec. 21, 1950 2 Sheets-Sheet 2

INVENTORS
William C. Speed
James J. Dwyer
BY
Pennie, Edmonds, Morton & Barrows
ATTORNEYS

UNITED STATES PATENT OFFICE 2,664,139

PRODUCTION OF MAGNETIC SOUND TAPE

William C. Speed, Riverside, and James J. Dwyer, Stamford, Conn., assignors to Audio Devices, Inc., New York, N. Y., a corporation of New York Application December 21, 1950, Serial No. 201,987

20 Claims. (Cl. 154—42.3)

This invention relates to the production of magnetic recording tape and has for its object more particularly improvements in the method of and apparatus for splicing coated tape base.

This application is copending with applications, Serial Nos. 201,985 and 201,986 filed December 21, 1950, simultaneously herewith. In accordance with the disclosures of those applications, tape base coated with finely divided magnetic material is advanced from a roll in a charging zone to a main cutting or slitting zone; the tape base is cut lengthwise into a plurality of pieces of magnetic tape as it moves through the cutting zone. The moving pieces of tape are spaced from one another in a separating zone, while the flat faces of the pieces of tape simultaneously are brought in wiping contact with a physical object to prevent lash thereof; after which the spaced pieces of tape move into a winding zone where they are wound separately and simultaneously into rolls.

The forward movement of the cut pieces of tape and of the uncut tape base is stopped when a predetermined amount of tape is released for winding onto the rolls, and the tape base is cut transversely in a splicing zone in advance of the main cutting zone to provide the amount desired. The adjacent ends are spliced with a continuous adhesive binder band extending across the tape base; after which the forward movement of the cut pieces of tape and of the spliced tape base is resumed. As the adhesive binder band goes through the main cutting zone, it, like the tape base to which it adheres, is cut into pieces of the same narrow width. When the pieces of tape, up to the pieces of adhesive binder band attached thereto, are wound or almost wound on the rolls, the pieces of tape are cut a short distance behind the pieces of adhesive binder band, leaving a short tail piece of tape dangling therefrom. This is pulled away and discarded, leaving a tab of the adhesive binder band which is grasped by an operator and pressed against the outer layer of tape on the roll to bind it thereon. The tab is pulled away of course when the roll of tape is used for recording or reproducing sound.

As pointed out in copending applications, Serial Nos. 201,974 and 201,975, filed December 21, 1950, also simultaneously herewith, various tape base materials are used, such as paper, plastic, etc. The most common ones today are paper and cellulose acetate. Various magnetic materials may be used to coat the tape base. The one most commonly used at the present time is very finely divided magnetic oxide of iron produced artifically. A dispersion of the magnetic material in a suitable liquid vehicle or carrier is prepared. The resulting free-flowing magnetic material is then placed as a layer on one side of the tape base and dried.

No matter how carefully the tape base is made and how carefully the coating operation is conducted, difficulties arise which affect the quality of the resulting magnetic tape. The tape base itself may have an occasional pimple or berry-like projection; a blister; or a foreign particle may be deposited on and cling to the tape base during the coating operation. Such obstructions are objectionable on several accounts; they affect the sound-recording and reproducing characteristics of the tape. They affect the thickness of the coating, with the same result. They may cause physical damage to the tape base while it is being coated.

A continuous coating of optimum uniform thickness and quality is required for high fidelity sound recording and sound reproducing. Such a coating is sometimes not obtained here and there on the tape base for various reasons and the sound-recording and sound-reproducing characteristics of the tape are therefore impaired.

Fortunately, sections of the tape base that contain obstructions, that are damaged, or that are impaired otherwise, such as by irregularities in the coating, may now be suitably located and marked, for example, as disclosed in the copending applications last-mentioned, and then cut out as disclosed in the copending applications first-mentioned, while the coated tape base as a whole advances through the discharging or feeding, splicing, cutting or slitting, and winding zones.

Now, to return to what can be done with the coated tape base in the splicing zone in the latter mentioned contingencies. The forward movement of the cut pieces of magnetic tape and of the uncut coated tape base is stopped when a marked or affected section or place reaches the splicing zone. The marked or affected section, whether due to an obstruction, impaired quality, etc., is cut out completely transversely of the tape base and discarded. The adjacent ends are spliced on their uncoated sides with a continuous narrow piece of adhesive splicing band extending across the tape base, preferably at an angle; after which the forward movement of the cut pieces of magnetic tape and of the spliced tape base is resumed. As the adhesive splicing band goes through the main cutting zone, it, like the tape base to which it adheres, is cut into pieces of the same narrow width. The forward movement of the cut pieces of tape, unspliced and spliced, and of the remaining uncut and unspliced tape base is stopped when a predetermined amount of tape is released for winding onto the rolls. As already pointed out the tape base is cut transversely in the splicing zone, spliced with an adhesive binder band; after which forward movement of the cut pieces of tape and of the spliced tape base is resumed. The present application relates to the method of and apparatus for performing such splicing and binding operations.

These and other features of the invention will be better understood by referring to the accompanying drawings, taken in conjunction with the following description, in which.

Figures 1, 2, 3:
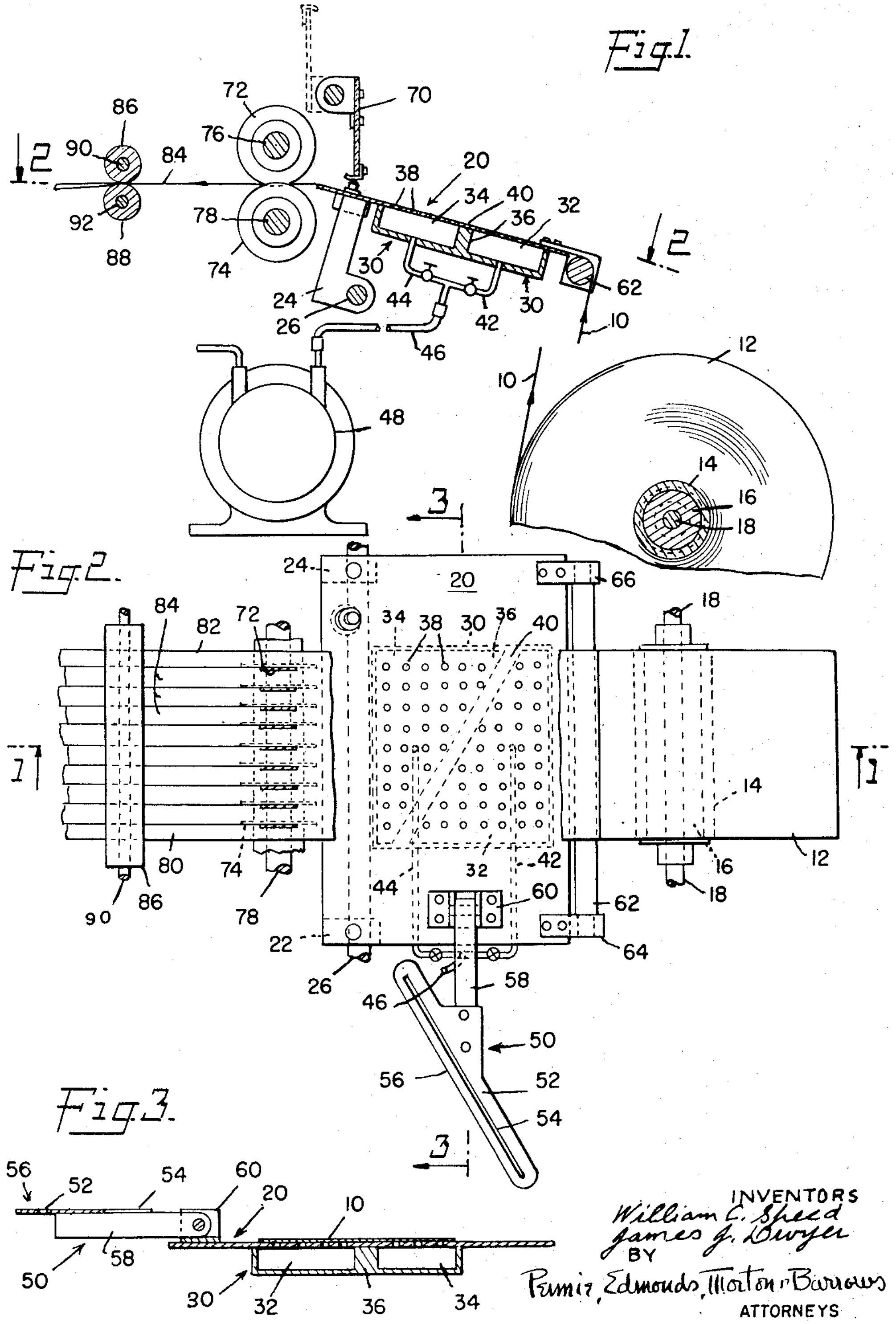
Fig. 1 is a side elevation in section on the line 1—1 of Fig. 2, showing an apparatus illustrative of a practice of the invention.
Fig. 2 is a plan view on the line 2—2 of Fig. 1.
Fig. 3 is a transverse section on the line 3—3 of Fig. 2.

Referring to Fig. 1, there is shown in the charging or feeding zone a coated tape base 10 wound in a roll 12, on a hub 14 into which is fitted a core 16 mounted on a shaft 18. A linear length or footage counter device, not shown, is associated with the roll and shaft to determine the amount of tape base unwound from the roll; in other words, the amount of tape base fed or charged for slitting, and hence the amount of ultimate tape.

Going next to the tape base splicing and binding zone, the apparatus includes a platform 20, preferably inclined upwardly, over which the tape base may travel on its way for processing. The platform at its left or upper end is supported by a pair of spaced brackets 22 and 24 pivotally mounted on a rod 26 extending transversely underneath the platform and supported in journals, not shown. The brackets may be pivoted to give the platform a desired tilt, after which they may be suitably locked to the rod.

The underside of the platform is provided with a suction box 30 divided into two, upper and lower, compartments 32 and 34 by a partition 36. As shown in Fig. 2, the portion of the platform immediately above the suction box is perforated with a plurality of small spaced holes 38, except for a narrow transverse cutting area 40 extending diagonally at an angle of about 60° over the top of the suction box, directly above the partition; the purpose of which is discussed below. Returning to Fig. 1, valved branch conduits 42 and 44 connect the compartments with a main conduit 46 leading to a vacuum pump 48.

Figures 4, 5, 6, 7, 8, 9, 10, 11, 12, 13, 14, 15, 16, 17, 18, 19, 20, 21:
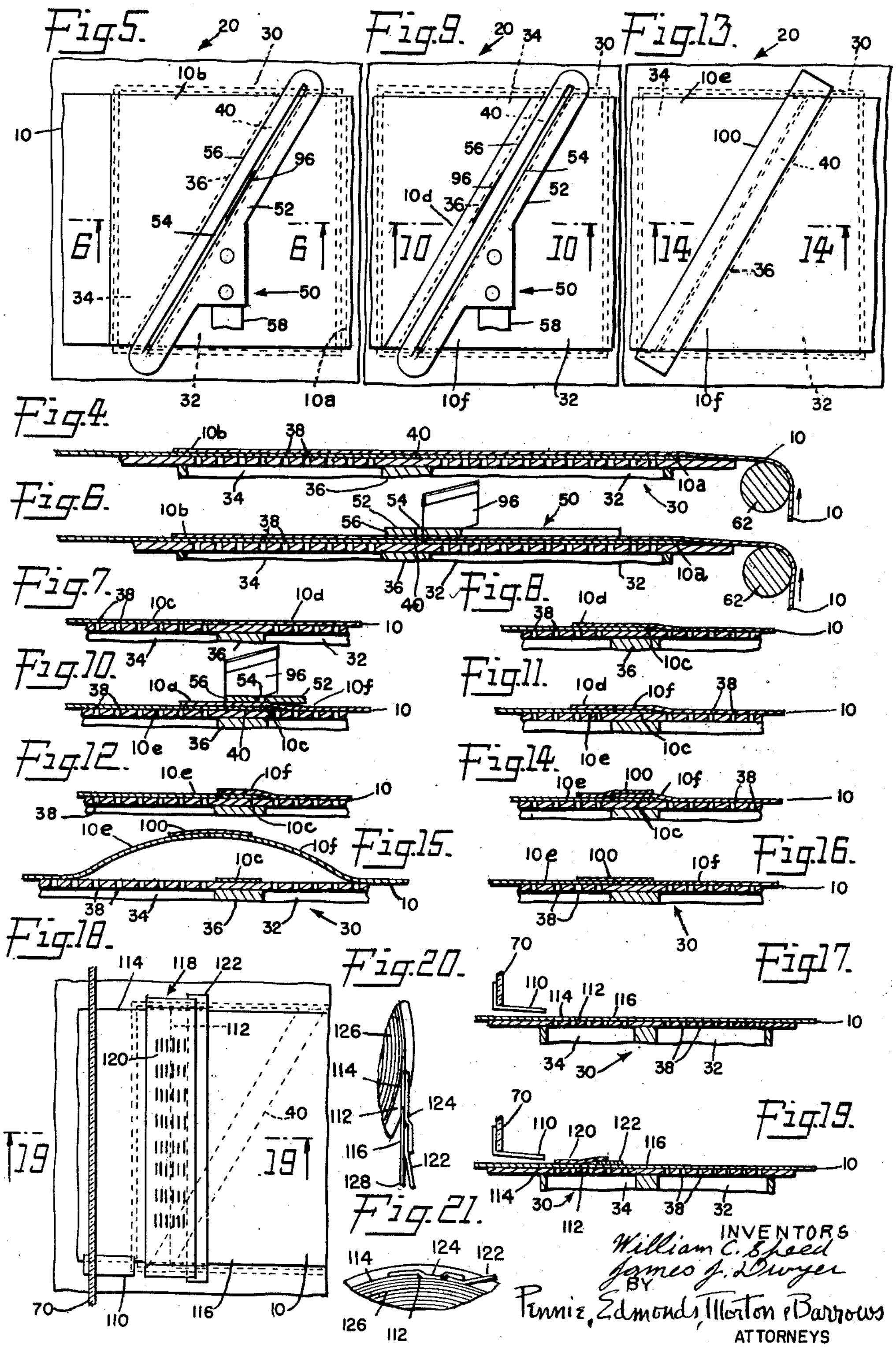
Figs. 4–21 show various ways in which the apparatus may be used for such tape base splicing and binding purposes.

A cutting guide 50 (Fig. 2) is placeable over cutting area 40. It is in the form of a narrow flat plate 52 with an elongated centrally disposed straight cutting slot 54 and an outer straight cutting edge 56 parallel to the cutting slot; the purpose of which is discussed below. The plate is secured to one end of a lateral arm 58 pivotally secured at the other end to a bracket 60 in turn fastened to the near side of the platform. As shown in Figs. 5 and 9, the cutting guide may be swung directly over cutting area 40 at the same diagonal angle.

The right or lower end of the platform, as shown in Figs. 1 and 2, is provided with a transverse roller 62 the off-set ends of which fit in journaled brackets 64 and 66 secured to and extending from the lower end of the platform. The arrangement is such that the top of the roller is in substantial alignment with the top surface of the platform. Tape base 10 may then be passed smoothly from roll 12 over the roller and upwardly across the platform, to and under a pivoting safety device or shield 70, to and through a plurality of spaced power driven upper cutting discs 72 and complementary lower cutting discs 74, mounted on power driven shafts 76 and 78, respectively where the tape base is cut into narrow edge pieces 80 and 82, into a plurality of narrow pieces of magnetic tape 84. The narrow pieces of tape then pass to and through a pair of power driven gripping rollers 86 and 88, mounted on power driven shafts 90 and 92, respectively. The last-mentioned structural elements are not important here; they are described in detail in the first-mentioned copending applications. The narrow edge pieces of tape base are discarded and the narrow pieces of magnetic tape are separated, spaced apart, and wound into rolls, as also described in those applications.

While the need for splicing the tape base may not be frequent, particularly when the production operation as a whole goes smoothly, it is necessary at times. When, for example, roll 12 of the tape base is exhausted before the final reels of cut tape are fully wound, another roll of tape base must be placed in position for charging or feeding. The forward end of the tape base on the second roll must, therefore, be spliced to the rearward end of the tape base from the first roll.

The tape base is sometimes torn or otherwise damaged in handling after it has been coated and wound on a large roll. The torn or damaged part is cut out and the main ends of the tape base are then spliced.

Defects, such as pimples, berries, blisters or other enlarged portions, may exist in the tape base itself, before it is coated. They may be noted and marked during the magnetic coating operation for subsequent treatment. That treatment occurs advantageously when the affected area of the tape base reaches the splicing zone.

Defects in the tape base may occur during the magnetic coating operation. For example, the coating may not be uniform in transverse thickness; it may be too thick or too thin; it may vary in quality, etc. In any event, the affected areas likewise may be noted and marked for subsequent elimination, such as in the present splicing zone.

Whatever it is that makes a splice necessary or desirable, it may be assumed for the moment that the tape base is being pulled across the top of the splicing platform and that an undesired section previously noted is to be cut out. When the section reaches the splicing zone, the machine is stopped. The extent of the affected section is noted and then suitably cut out. This may be done by tearing or cutting tape base 10. The fact that the main ends are tattered or irregular makes no difference.

Figs. 4 to 16 may now be considered to determine the successive steps that may be employed advantageously to splice the main ends, which are designated initially as 10*a* and 10*b*. They are overlapped as shown in Fig. 4; the former being underneath and both of them being over perforations 38 in the portion of splicing platform 20 above suction box 30. Vacuum pump 48 is placed in operation; valves in branch conduits 42 and 44 are opened; and compartments 32 and 34 of the suction box are placed under suction. Since end 10a is shown extending completely across the top of the suction box, it is drawn tightly against the splicing platform. End 10b is not, and need not be, under suction for the first cut. However, the ends may be arranged, if desired, so that both of them are under suction. This can be done by shortening end 10a.

Cutting guide 50 (Figs. 2 and 3) is swung over and down on the overlapping ends (Fig. 5). The operator then places a cutter 96, such as a safety razor blade, in and draws it completely through slot 54 of the cutting guide (Fig. 6), which is near the lower side of cutting area 40. Ends 10a and 10b are cut off, leaving two new main ends 10c and 10d. Old end 10b is removed; new end 10d is lifted and old end 10a is removed, thus leaving the two new main ends (Fig. 7). End 10d is lifted and pulled upwardly a short distance to span the cutting area and to overlap end 10c (Fig. 8).

Cutting guide 50 is then swung back and placed over the overlapping ends (Fig. 9); and the operator makes another but different kind of cut. This time he draws the razor blade along straight cutting edge 56 (instead of slot 54) which is near the lower side of cutting area 40 (Fig. 10, a section on the line 10—10 of Fig. 9). The spacing of the lines of cut operates to space the amount of overlap. The cutting guide is again swung away, leaving cut-off ends 10c and 10d and new and final main ends 10e and 10f (Figs. 10 and 11). Top cut-off end 10d is removed; thus leaving cut-off end 10c below new main end 10f (Fig. 12).

A narrow splicing band 100, with an adhesive undersurface, is then placed over the last line of cut (Figs. 13 and 14). This has the effect of keeping new and final main ends 10e and 10f in abutment with each other. The spliced tape base is then raised (Fig. 15); cut-off end 10c is removed; and the spliced tape base is lowered to the platform (Fig. 16).

The first cut, which is made by drawing the razor blade through the cutting slot of the cutting guide, is preparatory in nature. It need not be so accurate as to assure a straight line end-to-end abutting relationship between the main ends of the tape base. Its main purpose is to eliminate relatively long overlapping ends of the tape base and thus to facilitate the second cutting operation when the amount of overlap is quite small and when both ends are under adequate suction to hold them securely in position, so that they may be cut with precision.

The second cut is made along a straight edge which assures a sharp, straight, precise cut and thus a spliced joint line that is hardly visible to the eye. As a result of these successive steps, the spliced tape base is adapted to function as though it were a continuous whole; its sound-recording and sound-reproducing characteristics are not impaired because of the splice.

After the tape base is spliced it is ready for further processing. Before starting the machine so that the spliced tape base may continue in its path of travel, the suction applied to the suction box advantageously is not completely shut off. In a presently preferred practice the suction box is continuously under some suction so that the forward movement of the tape base over the platform is to a certain extent resisted. This facilitates the cutting operation when the tape base is cut into a plurality of relatively narrow pieces of tape.

In a presently preferred practice the tail end of each cut piece of magnetic tape wound into a roll is provided with a tab for binding it to its roll. To this end the tape base, before it is cut into a plurality of pieces, is provided with a transverse adhesive binder band in advance of the cutting operation, so that as the adhesive binder band goes through the cutting zone, it, like the tape base to which it adheres, is cut into a plurality of narrow pieces. Each narrow piece of adhesive binder band then becomes a tab for binding the tail end of a piece of the tape to its roll. This is a highly advantageous procedure as may be gathered from the following explanation.

As shown in Figs. 17–21, a small guide 110 of any suitable material is attached (Figs. 17–19) to the bottom of safety shield 70, directly above the near side of the tape base passing thereunder. The guide may be in the form of a piece of cardboard pasted to the shield, with a rearwardly extending portion. The purpose of the guide is to indicate to the operator approximately where the tape base should be cut transversely. When he notes that the desired amount of tape has been fed to the machine to provide rolls of tape of desired length, he throws a switch to stop the machine and hence movement of the tape base. He then cuts the tape base on a line of cut 112 (Fig. 17) a relatively short distance to the right of the guide, leaving a main tail end 114 and a main forward end 116. While the operator may use a straight edge to make the cut, in practice he merely runs a cutter, such as the razor blade used in the splicing operation described above, straight across the tape base in approximately parallel relationship to the safety shield.

As already indicated, suction box 30 normally is under a slight amount of suction. This is sufficient ordinarily to hold the tape base for the present cutting operation. If desired, however, the suction may readily be increased.

In any event after the cut has been made, a specially designed piece of adhesive binding band 118 (Fig. 18) is applied over the adjacent ends of the tape base, adjacent the line of cut. The adhesive band consists essentially of two main parts: a relatively broad splice part 120 with an adhesive undercoat and a relatively narrow tab part 122 with no adhesive adapted to be gripped by the fingers. In the instant construction the tab is secured to the underside of the splice part, and extends rearwardly. The splice part is sufficiently broad to present a substantial amount of adhesive surface to both ends 114 and 116 of the cut tape base. The portions of adhesive binding band extending beyond the ends of the tape base are cut off so that they will not adhere to the cutters and rollers that follow.

The operator then throws the switch to start the machine, and to cause the tape base again to advance. It will be clear from what has already been said that as the tape base advances through the cutting zone, the adhesive binding band and the magnetic tape base to which it is attached are cut simultaneously into a plurality of narrow pieces.

Each narrow piece of adhesive binding band 124, now referred to as a binding tab, for convenience, advances with its narrow piece of magnetic tape, still functioning to splice its cut ends. The two outer side pieces of tape are discarded, as stated above, while the inner pieces advance to the winding zone and are each wound into a roll 126. When the binding tabs almost reach the rolls, the machine is stopped and the pieces of tape are cut a short distance to the rear of the tabs, leaving short pieces of tape 128 dangling therefrom (Fig. 20). The tab of each narrow piece of adhesive binding band is grasped by the operator with the fingers of one hand and its short piece of rearwardly extending dangling tape 128 is grasped with the fingers of the other hand. He then pulls them apart, thus breaking the splice at line of cut 112 and leaving the tab secured to the tail end of its piece of tape on the roll. The freshly exposed adhesive portion of the tab is then pressed onto and is secured to its roll of magnetic tape (Fig. 21).

From what has been said, it will be clear that platform 20 and suction box 30 perform a number of useful functions. Their use for splicing the coated tape base as a permanent matter and as a temporary expedient to attach a binder tab have been emphasized. It has also been suggested that they may be used to facilitate cutting or slitting the coated tape base. If a moderate amount of suction is applied to the tape base as it advances over the platform to power driven cutters 72—74, and as the cut pieces of tape pass through power driven gripping rollers 86—88, the tape base is placed under substantial tension. That is to say, while the gripping rollers are pulling the cut pieces of tape forwardly, the platform and suction box exert a dragging or holding-back action on the tape base to resist its forward movement. This causes the tape base to be quite taut lengthwise and crosswise as it moves into the cutters, as a result of which the cutting edges of the cutters bite into and through the tape base more readily, thus assuring sharply defined lines of cut. The suction applied continuously to the tape base also helps to keep it in alignment as it advances from roll 12, over roller 62, and across the platform to the cutters.

It will be clear to those skilled in this art that the above example is only by way of illustration and that other useful modifications may be employed in the practice of the invention.

We claim:

1. In the method of producing sound-recording and sound-reproducing magnetic tape by cutting a relatively long and narrow tape base coated on one side only with finely divided magnetic material into a plurality of pieces of tape as it moves in a fixed path of travel from a charging zone through a cutting zone and the cut pieces of tape move at the same time to a winding zone where they are wound simultaneously into separate rolls, the improvement which comprises stopping the forward movement of the cut pieces of tape and of the tape base when a portion of the tape base to be spliced to a second piece of tape base reaches a splicing zone in the path of travel in advance of the cutting zone, overlapping the ends of the two pieces of tape base to be spliced, cutting the overlapped ends of the two pieces of tape base transversely to provide two new ends with adjacent lines of cut in abuttable relation to each other, attaching an adhesive band on the two new ends of the tape base across their adjacent lines of cut to keep them in abutment, and resuming the forward movement of the cut pieces of tape and of the spliced pieces of tape base.

2. Method according to claim 1, in which the adhesive band is applied to the uncoated side of the two pieces of tape base so that a substantially continuous coating of magnetic material is presented at the line of splice.

3. Method according to claim 1, in which the two pieces of tape base advance in their path of travel with their uncoated sides uppermost; and the adhesive band is applied to those sides so that a substantially continuous coating of magnetic material is presented at the line of splice.

4. Method according to claim 1, in which at least one end of one of the two pieces of tape base is kept in stationary position by suction applied thereto when it is cut transversely.

5. Method according to claim 1, in which the ends of the two pieces of tape base are kept in stationary position by suction applied thereto while the adhesive band is attached.

6. Method according to claim 1, in which the adhesive band is applied to the uncoated side of the two pieces of abuttable tape base so that a substantially continuous coating of magnetic material is presented at the line of splice, and the ends of the two pieces of tape base are kept in stationary position by suction applied thereto while the adhesive band is attached.

7. Method according to claim 1, in which the two pieces of tape base advance in their path of travel with their uncoated sides uppermost; and the adhesive band is applied to those sides so that a substantially continuous coating of magnetic material is presented on the coated sides at the line of splice; and the abuttable ends of the two pieces of tape base are kept in stationary position by suction applied thereto while the adhesive band is attached.

8. In the method of producing sound-recording and sound-reproducing magnetic tape by cutting a relatively long and narrow tape base coated solely on one side with finely divided magnetic material into a plurality of pieces of the tape as it moves in a fixed path of travel from a charging zone through a cutting zone and the cut pieces of tape move at the same time to a winding zone where they are wound simultaneously into separate rolls, the improvement which comprises stopping the forward movement of the cut pieces of tape and of the tape base when a portion of the tape base to be spliced to a second piece of tape base reaches a splicing zone in the path of travel in advance of the cutting zone, overlapping the ends of the two pieces of tape base to be spliced, holding at least one end of one of the two pieces of tape base in stationary position by suction applied thereto, cutting the overlapped ends of the two pieces of tape base transversely to provide two new ends with adjacent lines of cut in abuttable relation to each other, attaching an adhesive band on the uncoated side of the two new ends of tape base across their adjacent lines of cut to keep them in abutment, and resuming the forward movement of the cut pieces of tape and of the spliced pieces of tape base.

9. In the method of producing sound-recording and sound-reproducing magnetic tape by cutting a relatively long and narrow tape base coated solely on one side with finely divided magnetic material into a plurality of pieces of the tape as it moves in a fixed path of travel from a charging zone through a cutting zone and the cut pieces of tape move at the same time to a winding zone where they are wound simultaneously into separate rolls, the improvement which comprises stopping the forward movement of the cut pieces of tape and of the tape base when a portion of the tape base to be spliced to a second piece of tape base reaches a splicing zone in the path of travel in advance of the cutting zone, overlapping the ends of the two pieces of tape base to be spliced, holding at least one of the ends in stationary position by suction applied thereto, cutting the overlapped ends transversely to provide two new ends with adjacent lines of cut, removing the two free cut ends, overlapping the new ends, holding both new ends in stationary position by suction applied thereto, cutting the overlapped ends transversely to provide two newer ends with adjacent lines of cut in abuttable relation to each other, removing the outermost free cut end while retaining the innermost free cut end in its position as cut, attaching an adhesive band on the uncoated side of the two newer ends of tape base across their adjacent lines of cut to keep them in abutment, removing the innermost free cut end, and resuming the forward movement of the cut pieces of tape and of the spliced pieces of tape base.

10. Method according to the preceding claim, in which the first ends of the tape base to be spliced are overlapped with the tail end of the portion extending rearwardly from the cutting zone placed undermost and under suction to hold it in a stationary position; overlapping of the new or second ends is obtained by holding the new tail end in its cut position by suction and moving the new forward end of the second piece of tape base a short distance over the new tail end of the first piece of tape base and the following line of cut is made through the overlapped new ends.

11. In apparatus for producing sound-recording and sound-reproducing magnetic tape by cutting a relatively long and narrow tape base coated solely on one side with finely divided magnetic material into a plurality of pieces of the tape as it moves in a predetermined path of travel from a charging device through a cutting device and the cut pieces of tape move at the same time to a winding zone where they are wound simultaneously into separate rolls, the improvement which comprises a splicing device disposed in the path of travel between the charging device and the cutting device, the splicing device including a perforated platform and a suction box associated therewith so that the tape base may pass across the platform and tape base on the perforated platform may be placed under suction.

12. Apparatus according to claim 11, in which the suction box is divided into two adjacent chambers, and a valved conduit connects each chamber with a source of suction.

13. Apparatus according to claim 11, in which the platform is divided into two perforated portions with an imperforate narrow transverse cutting area between the two portions.

14. Apparatus according to claim 11, in which the platform is divided into two perforated portions with an imperforate narrow transverse cutting area between the two portions; and the suction box is divided into two adjacent chambers, each chamber being associated with one of the perforated platform portions; and a valved conduit connects each chamber with a source of suction.

15. Apparatus according to claim 11, in which a cutting guide is swingably associated with the platform so that the guide may be swung transversely across and away from the platform.

16. Apparatus according to claim 11, in which the suction box is divided into two adjacent chambers; a valved conduit connects each chamber with a source of suction; and a cutting guide is swingably associated with the platform so that the guide may be swung transversely across and away from the platform.

17. Apparatus according to claim 11, in which the platform is divided into two perforated portions with an imperforate narrow transverse cutting area between the two portions; a cutting guide is swingably associated with the platform so that the guide may be swung transversely across and away from the cutting area on the platform.

18. Apparatus according to claim 11, in which the platform is divided into two perforated portions with an imperforate narrow transverse cutting area between the two portions; the suction box is divided into two adjacent chambers, each chamber being associated with one of the perforated platform portions; a valved conduit connects each chamber with a source of suction; and a cutting guide is swingably associated with the platform so that the guide may be swung transversely across and away from the cutting area on the platform.

19. Apparatus according to claim 11, in which the platform is tilted at an angle upwardly from the charging device to the cutting device and is divided into two perforated portions with an imperforate narrow cutting area extending on an angle transversely across the platform; the suction box is divided into two adjacent chambers, each chamber being associated with one of the perforated platform portions; a valved conduit connects each chamber with a source of suction; and a cutting guide is swingably associated with the platform so that the guide may be swung transversely across and away from the angular cutting area on the platform.

20. Apparatus according to claim 19, in which the lower end of the platform is provided with a transverse roller at the same level to facilitate passageway of the tape base onto and across the platform.

WILLIAM C. SPEED.
JAMES J. DWYER.

References Cited in the file of this patent

UNITED STATES PATENTS

| Number | Name | Date |
|---|---|---|
| 1,259,834 | Cameron | Mar. 19, 1918 |
| 2,318,056 | Christman | May 4, 1943 |
| 2,361,265 | Christman | Oct. 24, 1944 |
| 2,539,611 | Daniel et al. | Jan. 30, 1951 |